Figure 1:
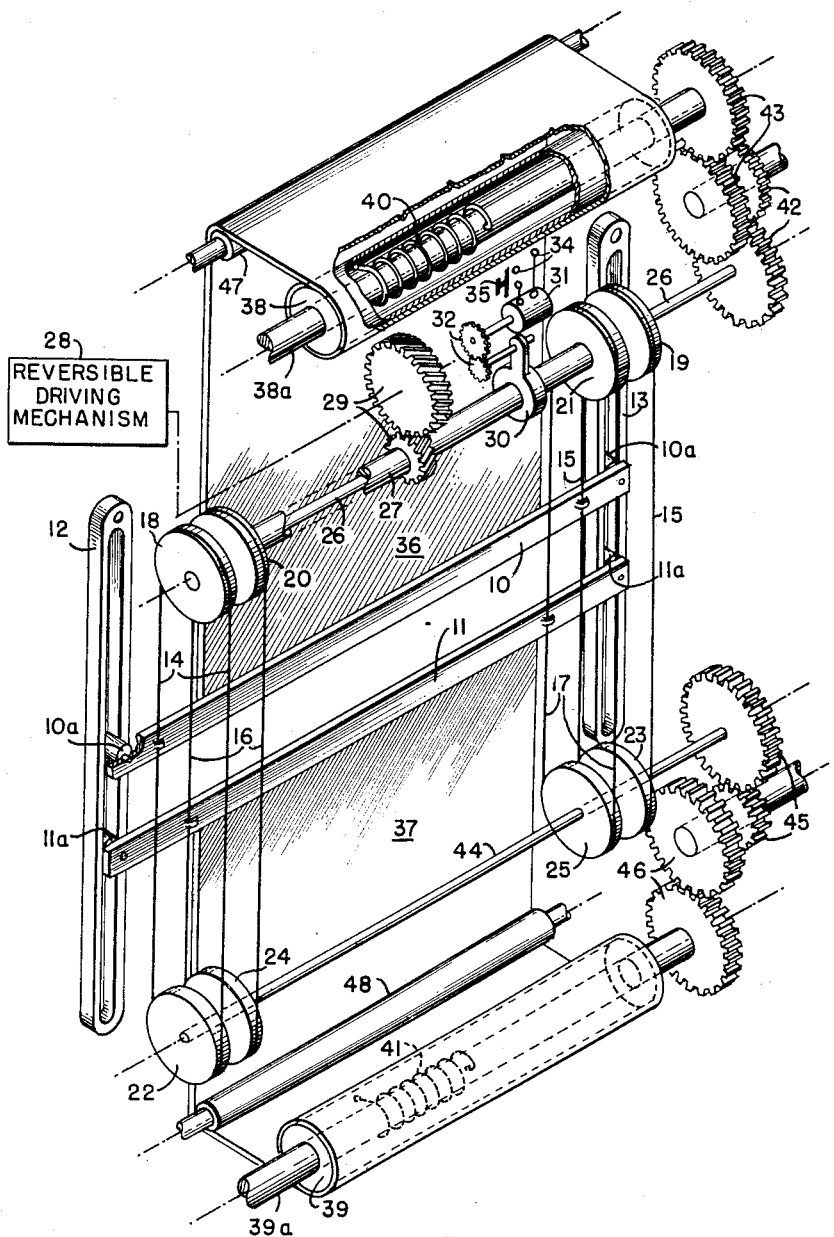

Oct. 6, 1959  I. W. DOYLE ET AL  2,907,256
FOCAL PLANE CAMERA SHUTTER
Filed Jan. 13, 1956  2 Sheets-Sheet 1

Oct. 6, 1959  I. W. DOYLE ET AL  2,907,256
FOCAL PLANE CAMERA SHUTTER

Filed Jan. 13, 1956  2 Sheets-Sheet 2

United States Patent Office 2,907,256
Patented Oct. 6, 1959

2,907,256

FOCAL PLANE CAMERA SHUTTER

Irving W. Doyle, Massapequa, and Alfred G. Nash, Glen Cove, N.Y., assignors to Fairchild Camera and Instrument Corporation, a corporation of Delaware Application January 13, 1956, Serial No. 558,974

9 Claims. (Cl. 95—57)

This invention relates to focal plane camera shutters and, more particularly, to such shutters for aerial camers adapted to be operated by remote control.

This application is a continuation-in-part of applicants' prior copending application, Serial No. 267,352, filed January 21, 1952, entitled "Focal Plane Camera Shutter," now abandoned, and assigned to the same assignee as the instant application.

Focal plane shutters heretofore proposed have, in general, comprised a single curtain with a shutter slit cut therein or a pair of co-operating curtains with their ends spaced to form a shutter slit, in either case the slit being defined by a pair of slit bars, the curtains being mounted on rollers at either side of the camera aperture. Movement of the slit bars to effect an exposure has generally been accomplished by appropriately driving the curtains by means of the rollers which are actuated by springs or other driving means, the curtains in turn actuating the slit bars. One such shutter is described in Patent 1,492,357 to Chamberlin. This construction has a number of disadvantages: for example, the stresses involved in acceleration and deceleration of the slit bars for rapid exposures is transmitted through the curtains and the required forces are generally derived at least in part from the curtain roller springs. As a result, the slit width tends to vary, resulting in a variation of exposure, both over a given exposure and as between exposures, due to the stretching or shrinking of the curtains, to variation of spring tension with variations in ambient conditions and with age, and other factors. Also, due to the resilience of the curtain material, the slit bars and the edges of the slit tend to become non-parallel, resulting in non-uniform exposure across the width of the film. Since the curtains must carry the operating stresses of the shutter, they are relatively heavy and their life is undesirably short.

It is an object of the present invention, therefore, to provide a new and improved focal plane camera shutter which is simple and rugged in construction and which obviates one or more of the disadvantages of prior focal plane camera shutters.

It is another object of the invention to provide a new and improved focal plane camera shutter having one or more of the following desirable characteristics: a slit width which is extremely constant over a wide range of operating conditions; a slit width which is extremely constant over an entire exposure; a slit of which the edges are maintained accurately parallel; curtains which are tensioned only to an extent necessary to limit the slack therein and thus may be of light weight material.

In accordance with the invention, a focal plane camera shutter comprises a pair of spaced rigid bars defining an exposure slit, a reversible driving mechanism connected directly to the bars positively to drive them in either direction across the focal plane to effect an exposure, a pair of curtains individually attached to and terminating at the bars, and a pair of winding rollers for the curtains. The shutter also comprises a pair of supporting shafts for the curtain rollers, resilient driving connections between such shafts and their respective rollers, and means for positively driving the roller shafts independently of any driving connection thereto from such bars through the curtains for feeding out one curtain and taking up the other during an exposure. For a better understanding of the present invention, together with other and further objects thereof, reference is had to the following description taken in connection with the accompanying drawings, while its scope will be pointed out in the appended claims.

Figure 1B:
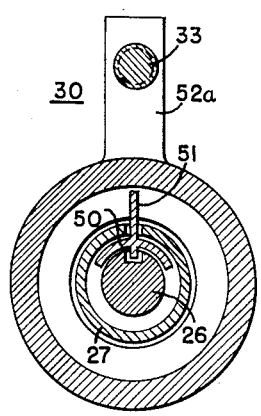
Figure 1A:
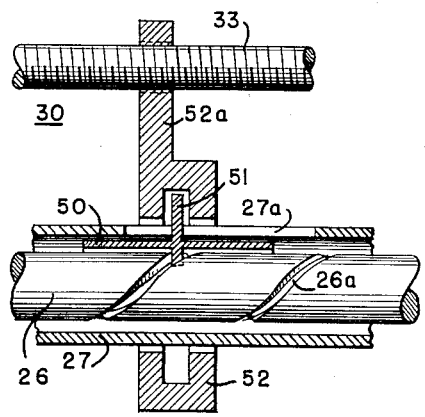

Referring now to the drawings:

Fig. 1 is a perspective view, partly schematic, of a focal plane camera shutter embodying the invenion; while Figs. 1a and 1b are cross-sectional details of the slit-adjusting mechanism of the shutter of Fig. 1.

Referring now to Fig. 1 of the drawings, there is represented a focal plane camera shutter embodying the invention and comprising a pair of spaced rigid bars 10 and 11 defining an exposure slit. These bars are provided with rollers 10a, 10a, and 11a, 11a, respectively, travelling in slotted guide rails 12 and 13 at either side of the shutter.

The shutter also comprises a reversible driving mechanism connected directly to the bars 10, 11 positively to drive them in either direction across the focal plane to effect an exposure. This driving mechanism may include pairs of tensioned inelastic strands such as the pairs of effectively endless steel cables 14, 15 and 16, 17, individually firmly attached to the slit bars 10 and 11, respectively. The reversible driving mechanism for driving the strands or cables 14–17, inclusive, in unison includes a pair of pulleys 18, 19 for driving the cables 14, 15, respectively, and the pulleys 20, 21 for driving the cables 16, 17, respectively. Preferably the cables 14 and 17 are given a plurality of turns around their respective pulleys 18, 21 and each is securely fixed to its respective pulley at each end to establish a positive driving connection, so that each of the cables is effectively an endless cable. The cables 14–17, inclusive, pass over a series of idler pulleys 22–25, inclusive, respectively, at the other end of the shutter. The pulleys 18 and 19 are mounted on a common shaft 26, while the pulleys 20, 21 are mounted on a common sleeve shaft 27 coaxial with the shaft 26.

There is also provided a reversible driving mechanism 28 for driving the shafts 26 and 27 in unison through a gearing 29. The driving mechanism 28 may be of any suitable type, but preferably of the type described and claimed in applicants' copending application, Serial No. 267,353, filed January 21, 1952. An adjustable linkage 30 is interposed in the driving connection between the shafts 26, 27, for adjusting the spacing of the slit bars 10 and 11 and thus the width of the exposure slit. This linkage may be of any conventional type, but one suitable construction is illustrated in Figs. 1a and 1b and described hereinafter. The linkage 30 may be actuated by remote control by means of a servo motor 31 driving the linkage through gearing 32 and shaft 33. The motor 31 may be energized from any suitable electrical supply terminals 34 through a suitable electrical control device, such as a manually operable pushbutton 35.

The shutter mechanism of the invention also includes a pair of curtains 36, 37 individually attached to and terminating at the slit bars 10, 11, respectively. There are also provided a pair of winding rollers 38, 39 for the curtains 36, 37, respectively, for feeding out one curtain and simultaneously taking up the other during an exposure independently of the driving connection to the bars 10 and 11. The curtains 36 and 37 also pass over idler rollers 47 and 48, respectively, for positioning them in the focal plane. The shutter mechanism also includes means for regulating the tensions on the curtains 36, 37 independently of the movement of the slit bars 10, 11. To this end, the winding rollers 38, 39 are provided with conventional internal biasing springs 40, 41, one end of each being connected to its associated roller and the other end being connected to the corresponding one of the roller shafts 38a, 39a in a conventional manner. The springs 40, 41 preferably have a very light spring constant proportioned primarily only to remove any slack from the associated curtain.

There is also provided means actuated by the driving mechanism for driving the shafts 38a, 39a of the rollers 38, 39, respectively, independently of any driving connection thereto from the slit bars 10, 11 through the curtains 36, 37, respectively, to regulate the tensions on the curtains 36, 37 during exposure. This means may comprise suitable gearing 42, 43 for driving the shaft 38a of roller 38 from the shaft 26 to which the pulleys 18 and 19 are keyed or otherwise secured. Similarly, the shaft 39a of roller 39 is driven through the gearing 45, 46 from the shaft 44 to which one or more of the pulleys 22–25, inclusive, are keyed or otherwise secured. The ratio of the gear drives 42, 43 and 45, 46 is such that the rollers 38, 39, if secured to their respective shafts, would feed out one curtain and take up the other during exposure at a velocity less than the velocity at which the slit bars 10, 11 are driven. Specifically, the gear ratio 45, 46 and constant of the spring 41 of the roller 39 are so selected that when the curtain 37 is fully taken up at the lower limit of movement of the slit bars 10, 11 and curtain 37, the tension on the curtain 37 is approximately zero. When the slit bars 10, 11 and the curtain 37 are actuated upward across the focal plane to effect an exposure, the slit bars 10 and 11 are moved at a higher velocity than the tangential velocity the roller 39 would have if secured to its shaft so that its spring 41 is gradually but slowly wound, increasing the tension on the curtain 37 so that it reaches its maximum value at the upper limit of exposure movement when the curtain 37 is fully fed out and under which condition a greater tension is required to eliminate slack from the curtain. A reverse regulation of the tension of curtain 37 is effected during movement of the slit bars 10, 11 in the opposite direction to effect a successive exposure. The operation of the roller 38, its drive shaft 38a, and its biasing spring 40 to regulate the tension on curtain 36 during exposure movements is similar but in opposite sense.

Referring now to Figs. 1a and 1b of the drawings, the adjustable linkage mechanism 30 comprises an elongated arcuate slider 50 disposed between the shafts 26 and 27. Secured in the slider 50 is a pin 51 which extends inwardly into a helical groove 26a in shaft 26 and outwardly into a longitudinal slot 27a in shaft 27. The pin 51 revolves in an annular collar 52 surrounding the shaft 27, the collar 52 having a radially extending arm 52a which is threaded on the shaft 33. It will be apparent that rotation of the shaft 33, causing longitudinal movement of the collar 52, pin 51, and follower 50, effects a relative angular movement between the shafts 26 and 27 and a corresponding relative movement between the pairs of cables 14, 15 and 16, 17 to adjust the spacing of the slit bars 10 and 11 and thus the width of the exposure slit.

It is believed that the operation of the shutter mechanism of the invention will be clear from the foregoing description. In brief, operation of the reversible driving mechanism 28 rotates the shafts 26 and 27 in unison, thereby driving the pairs of cables 14, 15 and 16, 17 in unison which, due to their rigid connections to the slit bars 10 and 11, respectively, positively drive them across the focal plane of the camera to effect an exposure. Since the rigid slit bars 10, 11 are driven by the inelastic steel cables which, in turn, are driven by the relatively rigid mechanism described, there is no relative movement between the bars 10, 11 during exposure, so that the width of the slit and the exposure rate remain precisely constant during an exposure. At the same time, the shafts 38a, 39a are driven through their respective gearings 42, 43 and 45, 46 but at velocities such that their respective rollers 38, 39 tend to feed out and take up the curtains at a slower rate than the movement of the slit bars 10, 11. Assuming that the slit was initially at the upper end of the focal plane and moving downwardly, the tension on the curtain 36, which initially is a minimum, preferably substantially zero, is gradually increased during the exposure to ensure that any slack is removed from the curtain. As the curtain is fed out to its maximum length, this slack-removing tension is gradually increased as required. At the same time, the slack-removing tension on the curtain 37, which was initially a maximum, is gradually decreased to a minimum, preferably substantially zero, when it is fully taken up on its roller 39. Thus, the curtains are solely light-blocking devices which transmit no substantial driving forces to the slit bars and are tensioned only sufficiently to remove any slack therefrom.

Due to the fact that the slit bars are positively driven by a relatively inelastic mechanism, there is no variation in the movement of either bar, and thus in the slit width, with variations in temperature, humidity, etc., or age, which might affect their movement if driven through the relatively elastic curtains.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A focal plane camera shutter comprising: a pair of spaced rigid bars defining an exposure slit; a driving mechanism connected to said bars positively to drive them across the focal plane to effect an exposure; a pair of curtains individually attached to and terminating at said bars; a pair of winding rollers for said curtains; a pair of supporting shafts for said rollers; resilient driving connections between said shafts and their respective rollers; and means for positively driving said roller shafts independently of any driving connection thereto from said bars through said curtains for feeding out one curtain and taking up the other during an exposure.

2. A focal plane camera shutter comprising: a pair of spaced rigid bars defining an exposure slit; a reversible driving mechanism connected to said bars positively to drive them in either direction across the focal plane to effect an exposure; a pair of curtains individually attached to and terminating at said bars; a pair of winding rollers for said curtains; a pair of supporting shafts for said rollers; resilient driving connections between said shafts and their respective rollers; and means for positively driving said roller shafts independently of any driving connection thereto from said bars through said curtains for feeding out one curtain and taking up the other during an exposure.

3. A focal plane camera shutter comprising: a pair of spaced rigid bars defining an exposure slit; a pair of inelastic tensioned strands individually connected directly to said bars; a mechanism for driving said strands in unison positively to drive them across the focal plane to effect an exposure; a pair of curtains individually attached to and terminating at said bars; a pair of winding rollers for said curtains; a pair of supporting shafts for said rollers; resilient driving connections between said shafts and their respective rollers; and means for positively driving said roller shafts independently of any driving connection thereto from said bars through said curtains for feeding out one curtain and taking up the other during an exposure.

4. A focal plane camera shutter comprising: a pair of spaced rigid bars defining an exposure slit; a pair of tensioned effectively endless steel cables individually connected directly to said bars; a pair of pulleys for individually driving said cables; mechanism for driving said pulleys in unison positively to drive said bars across the focal plane to effect an exposure; a pair of curtains individually attached to and terminating at said bars; a pair of winding rollers for said curtains; a pair of supporting shafts for said rollers; resilient driving connections between said shafts and their respective rollers; and means for positively driving said roller shafts independently of any driving connection thereto from said bars through said curtains for feeding out one curtain and taking up the other during an exposure.

5. A focal plane camera shutter comprising: a pair of spaced rigid bars defining an exposure slit; a pair of tensioned effectively endless steel cables individually connected directly to opposite ends of each of said bars; a plurality of pulleys for individually driving said cables; mechanism for driving said pulleys in unison positively to drive said bars across the focal plane to effect an exposure; a pair of curtains individually attached to and terminating at said bars; a pair of winding rollers for said curtains; a pair of supporting shafts for said rollers; resilient driving connections between said shafts and their respective rollers; and means for positively driving said roller shafts independently of any driving connection thereto from said bars through said curtains for feeding out one curtain and taking up the other during an exposure.

6. A focal plane camera shutter comprising: a pair of spaced rigid bars defining an exposure slit; a driving mechanism connected directly to said bars positively to drive them across the focal plane to effect an exposure; a pair of curtains individually attached to and terminating at said bars; a pair of winding rollers for said curtains for feeding out one curtain and taking up the other during an exposure; a pair of supporting shafts for said rollers; resilient driving connections between said shafts and their respective rollers; and means for positively driving said roller shafts independently of any driving connection thereto from said bars through said curtains for regulating the tension on said curtains independently of the movement of said bars.

7. A focal plane camera shutter comprising: a pair of spaced rigid bars defining an exposure slit; a driving mechanism connected directly to said bars positively to drive them across the focal plane to effect an exposure; a pair of curtains individually attached to and terminating at said bars; a pair of winding rollers for said curtains for feeding out one curtain and taking up the other during an exposure, each of said winding rollers having a supporting shaft and an interconnecting bias spring, said spring having a bias proportioned primarily to remove any slack from the associated curtain; and means actuated by said driving mechanism for positively driving said roller shafts independently of any driving connection thereto from said bars through said curtains to regulate the tensions on the curtains during exposure.

8. A focal plane camera shutter comprising: a pair of spaced rigid bars defining an exposure slit; a driving mechanism connected directly to said bars positively to drive them across the focal plane to effect an exposure; a pair of curtains individually attached to and terminating at said bars; a pair of winding rollers for said curtains for feeding out one curtain and taking up the other during an exposure, each of said winding rollers having a supporting shaft and an interconnecting bias spring, said spring having a bias proportioned primarily to remove any slack from the associated curtain; and means actuated by said driving mechanism for positively driving said roller shafts with such a speed ratio that, if said rollers were secured to their respective shafts, said curtains would be fed out and taken up during exposure at a velocity less than the velocity of said bars, whereby the tension on each curtain is a minimum when fully taken up and a maximum when fully fed out.

9. A focal plane camera shutter comprising: a pair of spaced rigid bars defining an exposure slit; a driving mechanism connected directly to said bars positively to drive them across the focal plane to effect an exposure; an adjustable linkage in said driving mechanism for adjusting the spacing of said bars and thus the width of the exposure slit; a pair of curtains individually attached to and terminating at said bars; a pair of winding rollers for said curtains; a pair of supporting shafts for said rollers; resilient driving connections between said shafts and their respective rollers; and means for driving said roller shafts for positively feeding out one curtain and taking up the other during an exposure.

References Cited in the file of this patent

UNITED STATES PATENTS

| | | |
|---|---|---|
| 684,750 | Fraley | Oct. 15, 1901 |
| 924,947 | Thornton | June 15, 1909 |
| 1,764,066 | Chamberlin | June 17, 1930 |
| 2,206,144 | Wittel | July 2, 1940 |
| 2,321,361 | Chappell et al. | June 8, 1943 |